United States Patent
Shim et al.

(10) Patent No.: US 10,680,726 B2
(45) Date of Patent: Jun. 9, 2020

(54) METHOD AND APPARATUS FOR ANTENNA PHASE CORRECTION IN LARGE-CAPACITY ANTENNA SYSTEM

(71) Applicant: Samsung Electronics Co., Ltd., Gyeonggi-do (KR)

(72) Inventors: Seijoon Shim, Seoul (KR); Chongdon Kim, Gyeonggi-do (KR); Hayoung Yang, Gyeonggi-do (KR); Joohyun Lee, Gyeonggi-do (KR); Chanho Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/463,123

(22) PCT Filed: Mar. 14, 2017

(86) PCT No.: PCT/KR2017/002745
§ 371 (c)(1),
(2) Date: May 22, 2019

(87) PCT Pub. No.: WO2018/117335
PCT Pub. Date: Jun. 28, 2018

(65) Prior Publication Data
US 2020/0067608 A1 Feb. 27, 2020

(30) Foreign Application Priority Data

Dec. 23, 2016 (KR) ............... 10-2016-0177809
Feb. 10, 2017 (KR) ............... 10-2017-0018454

(51) Int. Cl.
*H04B 17/12* (2015.01)
*H04B 17/14* (2015.01)

(52) U.S. Cl.
CPC ............ *H04B 17/12* (2015.01); *H04B 17/14* (2015.01)

(58) Field of Classification Search
CPC ...... H04B 17/00; H04B 17/10; H04B 17/101; H04B 17/102; H04B 17/103;
(Continued)

(56) References Cited

U.S. PATENT DOCUMENTS 6,339,399 B1 * 1/2002 Andersson ............ H01Q 3/267
342/174
2002/0058535 A1 5/2002 Lee
(Continued)

FOREIGN PATENT DOCUMENTS

KR 1020020037165 5/2002
KR 1020130075140 7/2013
(Continued)

OTHER PUBLICATIONS

PCT/ISA/210 Search Report issued on PCT/KR2017/002745, pp. 5.
PCT/ISA/237 Written Opinion issued on PCT/KR2017/002745, pp. 5.

*Primary Examiner* — Siu M Lee
(74) *Attorney, Agent, or Firm* — The Farrell Law Firm, P.C.

(57) ABSTRACT

The present disclosure relates to a 5G or pre-5G communication system for supporting a higher data transfer rate than a 4G communication system such as LTE. The method is for phase correction of an antenna in a large-capacity antenna system, the method includes grouping large-capacity antennas into a predetermined number of groups; setting a path such that ports of the grouped antennas have a feedback path; outputting a test signal to be outputted to each antenna port of each group by adding a code or sequence having orthogonality; separating signals for each antenna port in the group by using the code or sequence having orthogonality in a signal received through the feedback path; and calculating a calibration value by detecting a phase change of the separated signal.

15 Claims, 10 Drawing Sheets

(58) Field of Classification Search
CPC ...... H04B 17/104; H04B 17/11; H04B 17/12; H04B 17/14; H04B 17/15; H04B 17/16; H04B 17/19
See application file for complete search history.

(56) References Cited

U.S. PATENT DOCUMENTS

| | | | |
|---|---|---|---|
| 2004/0214604 A1* | 10/2004 | Yoon ...................... | H01Q 3/267 455/562.1 |
| 2006/0234694 A1* | 10/2006 | Kawasaki .............. | H01Q 3/267 455/423 |
| 2009/0267824 A1* | 10/2009 | Cooper .................. | H01Q 3/267 342/174 |
| 2010/0093282 A1 | 4/2010 | Martikkala et al. | |
| 2010/0142590 A1* | 6/2010 | Hohne .................. | H01Q 7/0617 375/141 |
| 2013/0113535 A1 | 5/2013 | Haralabidis | |
| 2013/0163457 A1 | 6/2013 | Kim et al. | |
| 2013/0163544 A1 | 6/2013 | Lee et al. | |
| 2013/0287076 A1 | 10/2013 | Afsahi et al. | |
| 2015/0126135 A1 | 5/2015 | Katipally et al. | |
| 2015/0372793 A1 | 12/2015 | Kang et al. | |
| 2016/0105870 A1 | 4/2016 | Won et al. | |
| 2019/0207309 A1* | 7/2019 | Shim ........................ | H01Q 3/26 |

FOREIGN PATENT DOCUMENTS

| | | |
|---|---|---|
| KR | 1020130075311 | 7/2013 |
| KR | 1020150118166 | 10/2015 |
| KR | 1020160043897 | 4/2016 |

* cited by examiner

METHOD AND APPARATUS FOR ANTENNA PHASE CORRECTION IN LARGE-CAPACITY ANTENNA SYSTEM

PRIORITY

This application is a National Phase Entry of PCT International Application No. PCT/KR2017/002745 which was filed on Mar. 14, 2017, and claims priority to Korean Patent Application Nos. 10-2016-0177809 and 10-2017-0018454, which were filed on Dec. 23, 2016 and Feb. 10, 2017, respectively, the content of each of which is incorporated herein by reference.

TECHNICAL FIELD

The disclosure relates to a method and apparatus for calibrating the phase of an antenna in a massive antenna system.

BACKGROUND ART

In order to satisfy a wireless data traffic demand that tends to increases after the $4^{th}$ generation (4G) communication system commercialization, efforts to develop an improved 5 (5G) communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

As described above, if the massive MIMO antenna system is adopted, there is a need for a technology for previously obtaining phase information between antennas and performing phase alignment between the antennas. A technology using phase alignment as described above is called an antenna calibration technology. The antenna calibration technology is chiefly used when beam-forming (BF) is chiefly used. For antenna calibration, there is a need for a process of estimating phase information on each antenna by transmitting a given calibration signal.

The massive MIMO system is a system for increasing the signal to noise ratio (SNR) of transmitted and received signals using massive antennas in order to improve data transmission efficiency. In LTE release 13/14, the massive MIMO system has been standardized as full-dimension multiple-input multiple-output (hereinafter FD-MIMO) and is also discussed as a major component technology even in the 5G communication system.

In the massive MIMO system, if antenna calibration is performed, the time taken for the antenna calibration increases because calibration must be performed on a large number of antennas. Furthermore, this acts as a burden of a system in that antenna calibration must be performed in the state in which typical communication services are stopped while the antenna calibration is performed. Particularly, in the massive MIMO system, the time taken for antenna calibration is further increased because the antenna calibration must be performed on each of a large number of antennas that much. As described above, a lot of time taken for antenna calibration may be a great burden on a system because the time during which communication is stopped is increased.

Accordingly, there is a need for an apparatus and method for reducing the time taken for antenna calibration in the massive MIMO system.

DISCLOSURE OF INVENTION

Technical Problem

The disclosure provides a method and apparatus capable of reducing the time taken for antenna calibration in a massive MIMO system.

The disclosure provides a method and apparatus capable of reducing a burden of a system by reducing an antenna calibration time in a massive MIMO system.

Solution to Problem

According to an embodiment of the disclosure, a method is a method of calibrating the phase of an antenna in a massive antenna system. The method may include grouping the massive antennas into the preset number of groups; configuring a path so that the grouped antenna ports have a feedback path; outputting a test signal to be output to each antenna port of each group by adding a code or sequence having orthogonality to the test signal; separating a signal from a signal received through the feedback path for each antenna port within a corresponding group using the code or sequence having orthogonality; and calculating a calibration value by detecting a change in the phase of the separated signal.

According to an embodiment of the disclosure, an apparatus is an apparatus for calibrating the phase of an antenna in a massive antenna system. The apparatus may include a wireless unit configured to include antenna ports corresponding to the respective antennas and feedback ports grouped in a given antenna number unit; a switching and analog/digital (A/D) converter configured to include transmission/reception switches corresponding to the respective antenna ports of the wireless unit and analog-digital converters corresponding to the transmission/reception switches; and a modem configured to control a configuration of a path so that the grouped antenna ports have a feedback path, generate a test signal to be output to each antenna port of each group, output the generated test signal by adding a different code or sequence having orthogonality to the test signal, separate a signal from a signal received through the feedback path for each antenna port within a corresponding group using the code or sequence having orthogonality, and calculate a calibration value by detecting a change in the phase of the separated signal.

According to an embodiment of the disclosure, an apparatus is an apparatus for calibrating the phase of an antenna in a massive antenna system. The apparatus may include a wireless unit configured to include antenna ports corresponding to the respective antennas and a feedback port corresponding to each of the antenna ports; a switching and analog/digital (A/D) converter configured to include transmission/reception switches corresponding to the respective antenna ports of the wireless unit and to include analog-digital converters corresponding to the transmission/reception switches and receiving signals output from the feedback ports; and a modem configured to generate and output a test signal to be output to each of the antenna ports and to calculate a calibration value by detecting a change in the phase from a signal received through each feedback path.

Advantageous Effects of Invention

If the massive MIMO system according to the disclosure is used, there are advantages in that a burden of a system can be reduced and communication efficiency can be improved by reducing the time taken for antenna calibration.

MODE FOR THE INVENTION

Figure 1:
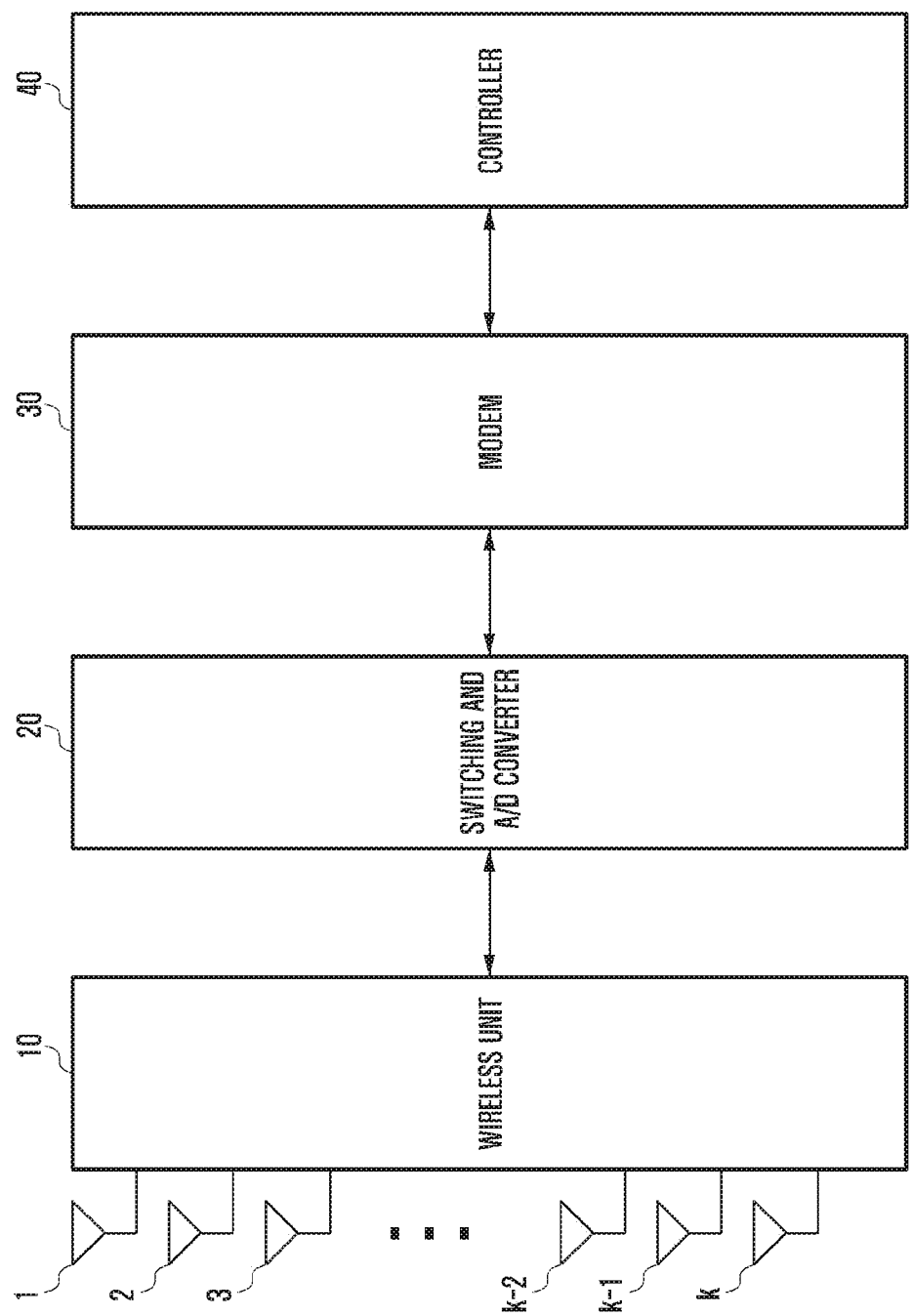
FIG. 1 is a functional block diagram of a massive MIMO antenna system.

Hereinafter, various embodiments are described in detail with reference to the accompanying drawings. It is to be noted that the same reference numerals are used throughout the drawings to refer to the same elements. Furthermore, it is to be noted that the accompanying drawings of the disclosure are provided to help understanding of the disclosure and the disclosure is not limited to a form or arrangement illustrated in the drawings of the disclosure. Furthermore, a detailed description of the known functions or elements that may make the gist of the disclosure vague is omitted. It is to be noted that in the following description, only parts necessary to understand operations according to various embodiments of the disclosure are described and a description of other parts is omitted in order to prevent the gist of the disclosure from becoming vague.

FIG. 1 is a functional block diagram of a massive MIMO antenna system.

In general, the massive MIMO antenna system is adopted in a base station. Accordingly, in FIG. 1, a base station is assumed and described. However, the massive MIMO antenna system may be adopted in a terminal in some cases, and may be applied in the same or similar form within the scope of the spirit of the disclosure.

As illustrated in FIG. 1, the massive MIMO antenna system includes a very large number of antennas. Antennas 1, 2, 3, . . . , k–2, k–1, k are connected to a wireless unit 10 and are located at the end where signals are transmitted and received. In this case, k indicative of the number of antennas may be a very large number.

The wireless unit 10 may include ports (not shown in FIG. 1) for transmitting signals to the antennas 1, 2, 3, . . . , k–2, k–1, k or receiving signals from the antennas 1, 2, 3, . . . , k–2, k–1, k. Furthermore, the wireless unit 10 up-converts and outputs a signal having a band necessary for a corresponding system, and converts a signal, received from a given antenna or a plurality of antennas, into a signal of a high frequency or baseband and outputs the converted signal. The elements of the wireless unit 10 necessary for the description of the disclosure are described with reference to the following drawings.

A switching and A/D converter 20 classifies and switches a path for transmitting a signal and a path for receiving a signal. The switching and A/D converter converts an analog signal, received from the wireless unit 10, into a digital signal and outputs the digital signal, and it converts a digital signal, received from a modem, into an analog signal and outputs the analog signal. The elements of the switching and A/D converter 20 necessary for the description of the disclosure are described more specifically in the following drawings.

The modem 30 generates and outputs signals for processing the respective antennas 1, 2, 3, . . . , k–2, k–1, k according to the disclosure, and may control the path setting of a signal in the switching and A/D converter 20 and the wireless unit 10. Furthermore, the modem 30 may measure signals for calibrating the phases of the antennas 1, 2, 3, . . . , k–2, k–1, k in accordance with a transmission path and reception path for the antennas, and may perform calibration based on the results of the measurement. The modem 30 may be configured in a communication processor form in order to control the above-described operation. Furthermore, the modem 30 may include memory for measuring the phase of a signal, storing measured information, and storing calibration information, although not shown. If the memory is not included in the modem 30, external separate memory (not shown in FIG. 1) may store or read the above-described data. Such a detailed operation is described more specifically in the following drawings.

A controller 40 performs overall control of a base station. For example, the controller 40 controls a given electronic device positioned within its cell and the transmission/reception of data and/or signals. Furthermore, the controller 40 may perform scheduling for the transmission/reception of data to/from a given electronic device. Furthermore, the controller 40 may perform control for communication with another device connected to a higher network. Most of control performed in the base station may be performed by the controller 40. Such control operations are widely known, and thus additional description thereof is omitted.

Figure 2:
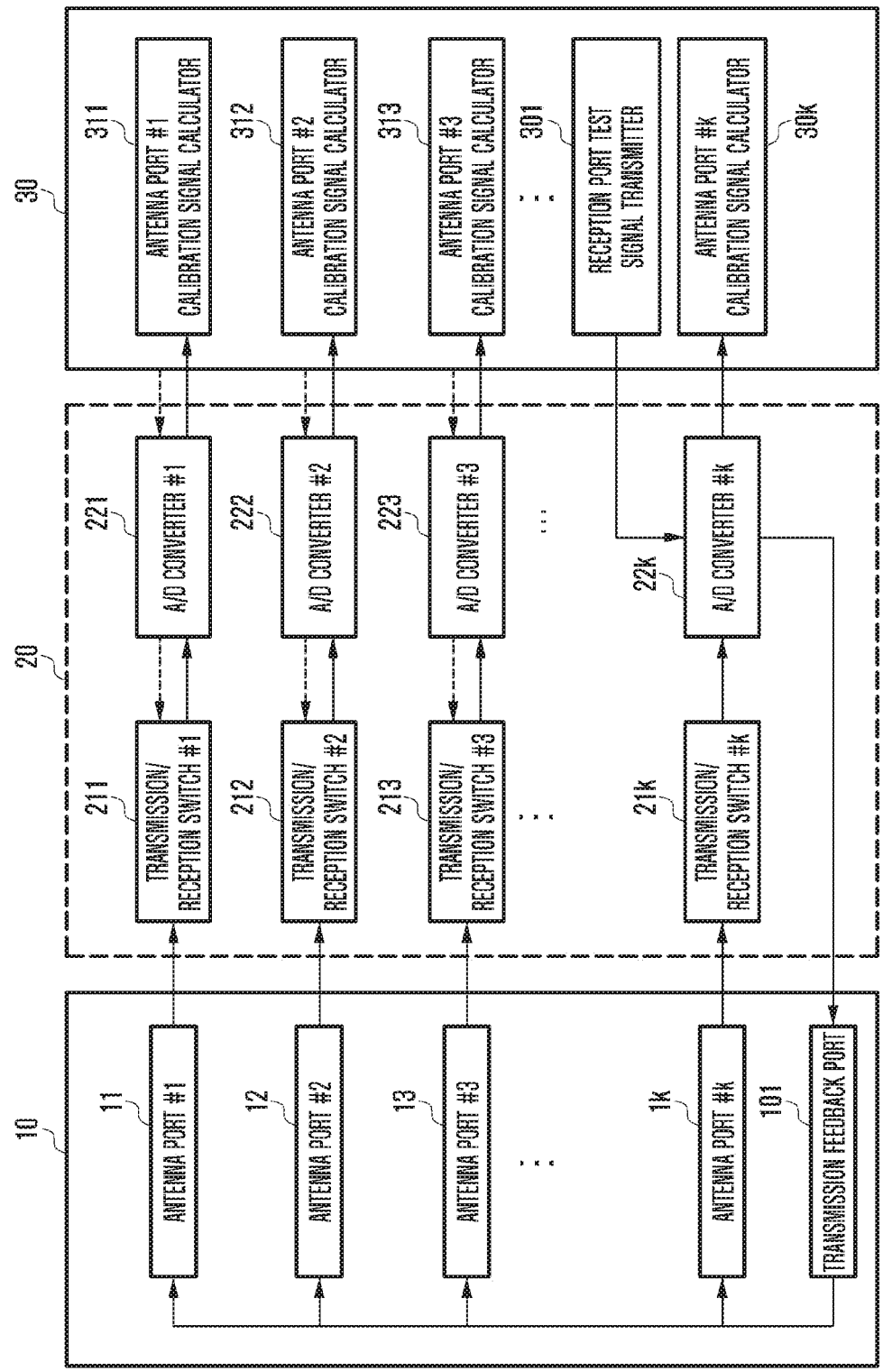
FIG. 2 shows a configuration for calibrating the received phases of antennas in a massive MIMO antenna system.

FIG. 2 shows a configuration for calibrating the received phases of antennas in a massive MIMO antenna system.

Elements and operations for performing calibration for the reception of antennas in the massive MIMO antenna system are described with reference to FIG. 2. Furthermore, in FIG. 2, in order to describe the measurement of a reception phase, lines corresponding to a reception operation are indicated by a solid line, and lines regarding a transmission operation not related to the reception of a signal are indicated by a dotted line. Furthermore, a detailed transmission operation is described more specifically with reference to the following drawings.

First, the configuration of FIG. 2 is described. The wireless unit 10 includes antenna ports 11, 12, 13, . . . , 1k corresponding to the number of antennas and a separate transmission feedback port 101. That is, the antenna port #1 11 of the wireless unit 10 corresponds to the antenna 1, the antenna port #2 12 thereof corresponds to the antenna 2, the antenna port #3 13 thereof corresponds to the antenna 3, and the antenna port #k 1k corresponds to the antenna k. Accordingly, the antenna ports 11, 12, 13, . . . , 1k may basically output signals, received from the respective antennas 1, 2, 3, . . . , k−2, k−1, k, to the switching and A/D converter 20. Furthermore, the wireless unit 10 may include the transmission feedback port 101 for feeding a test signal for test back to each of the antenna ports 11, 12, 13, . . . , 1k.

The configuration of the switching and A/D converter 20 is described below. The switching and A/D converter 20 includes transmission/reception switches 211, 212, 213, . . . , 21k and A/D converters 221, 222, 223, . . . , 22k, each one corresponding to the number of antenna ports 11, 12, 13, . . . , 1k. The transmission/reception switches 211, 212, 213, . . . , 21k may be mapped to the respective antenna ports 11, 12, 13, . . . , 1k. As illustrated in FIG. 2, the antenna port #1 11 of the wireless unit 10 corresponds to the transmission/reception switch #1 211 of the switching and A/D converter 20, the antenna port #2 12 thereof corresponds to the transmission/reception switch #2 212 thereof, the antenna port #3 13 thereof corresponds to the transmission/reception switch #3 213 thereof, and the antenna port #k 1k thereof corresponds to the transmission/reception switch #k 21k thereof. Furthermore, as illustrated in FIG. 2, the transmission/reception switches 211, 212, 213, . . . , 21k correspond to the respective A/D converters 221, 222, 223, . . . , 22k.

Each of the A/D converters 221, 222, 223, . . . , 22k may include a D/A converter for converting a digital signal to be transmitted therein into an analog signal and a band up-converter for band-up-converting the converted analog signal. Furthermore, each of the A/D converters 221, 222, 223, . . . , 22k may include a band down-converter for converting a high frequency signal of a band received therein into a signal of a high frequency or baseband and an A/D converter for converting a band-down-converted analog signal into a digital signal. In FIG. 2, a form including all of such elements has been illustrated as the A/D converter.

Finally, the modem 30 may include signal calculators or signal calculation modules corresponding the A/D converters 221, 222, 223, . . . , 22k, respectively. FIG. 2 illustrates calibration signal calculators 311, 312, 313, . . . , 31k corresponding to the respective antenna ports. Furthermore, the modem 30 may include a reception port test signal transmitter 301 for generating and transmitting a reception port test signal. The transmitter and the calculator may be configured in a module form, and may be configured in hardware logic, may be configured in software or may be configured in a firmware form.

An operation of measuring the phase of a reception antenna in the massive MIMO antenna system if such a configuration is included is described. First, the reception port test signal transmitter 301 generates a test signal for testing the phase of a received signal in each of the antenna ports 11, 12, 13, . . . , 1k, and outputs the test signal to the switching and A/D converter 20. In this case, the test signal is a signal already known by the modem 30.

The test signal output by the reception port test signal generator 301 may be converted into an analog signal through one of the plurality of A/D converters, and may be band-up-converted and output. FIG. 2 illustrates a case where the last A/D converter #k 22k converts a digital test signal into an analog test signal and band-up-converts and outputs the analog test signal. However, the digital test signal may be output through another A/D converter illustrated in FIG. 2 or through a separate A/D converter (not illustrated in FIG. 2).

The test signal that is converted into the analog signal and output through the A/D converter #k 22k is input to the transmission feedback port 101. The transmission feedback port 101 is connected to a feedback path for providing a signal to each of the antenna ports 11, 12, 13, . . . , 1k mapped to the respective antennas. Accordingly, the same test signal output by the transmission feedback port 101 is input to all the antenna ports 11, 12, 13, . . . , 1k used in the massive MIMO antenna system. Accordingly, the antenna ports 11, 12, 13, . . . , 1k may receive the same test signal at the same point of time. The test signals received by the respective antenna ports 11, 12, 13, . . . , 1k are input to the transmission/reception switches 211, 212, 213, . . . , 21k corresponding to the respective antenna ports.

Each of the transmission/reception switches 211, 212, 213, . . . , 21k is an element for switching the path of a transmitted signal and received signal, and may switch the test signal to a reception path under the control of the modem 30 or under the control of the controller 40. In FIG. 2, such control lines have not been shown and only the transmission/reception path of a signal has been shown because the lines in the drawing are complicated.

The test signal connected from each of the antenna ports 11, 12, 13, . . . , 1k to the reception path through each of the transmission/reception switches 211, 212, 213, . . . , 21k is input to each of the A/D converters 221, 222, 223, . . . , 22k. Each of the A/D converters 221, 222, 223, . . . , 22k band-down-converts the band-up-converted analog test signal into a digital signal and outputs the digital signal. The signal output by each of the A/D converters 221, 222, 223, . . . , 22k as described above is input to each of the antenna port calibration signal calculators 311, 312, 313, . . . , 31k included in the modem 30.

Each of the antenna port calibration signal calculators 311, 312, 313, . . . , 31k may receive the fed-back and received test signal and then detect a change in the phase using an already known transmitted signal. When a change in the phase is detected as described above, the antenna port calibration signal calculator may calculate a change in the phase in the reception path by comparing the phase of the received signal with the transmitted signal. Accordingly, the modem 30 may perform the calibration of a phase on a reception path corresponding to each of the antenna ports 11, 12, 13, . . . , 1k for each antenna.

As described above, in the calibration of a received signal, a change in the phase can be easily detected for each path through the feedback path by transmitting one signal. Accordingly, the phase may be calibrated from a table in which a necessary phase calibration value has been stored for each reception path or the phase of an antenna may be adjusted through given calibration computation for each reception path.

Figure 3:
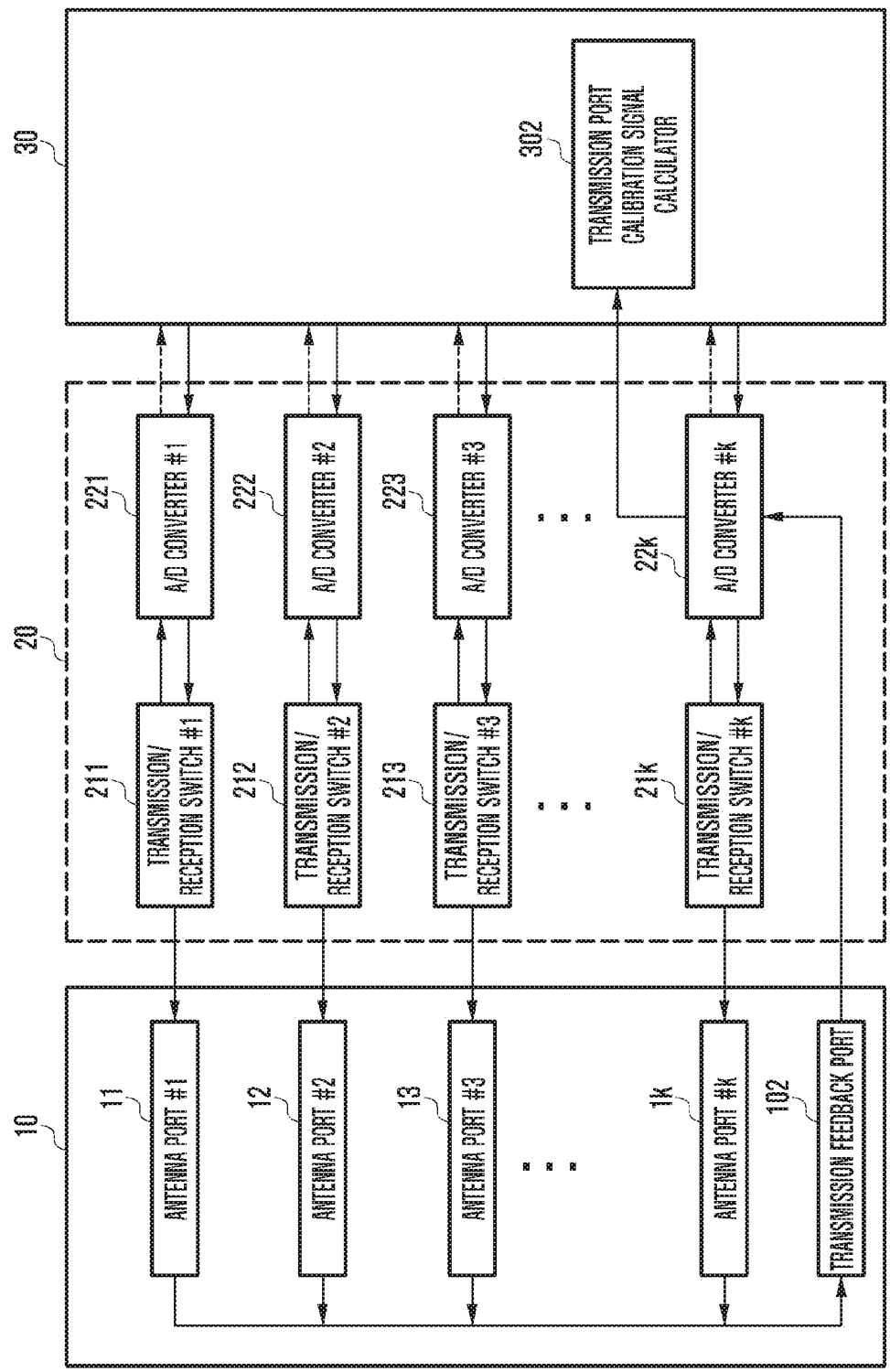
FIG. 3 shows a configuration for calibrating the transmission phases of antennas in a massive MIMO antenna system.

FIG. 3 shows a configuration for calibrating the transmission phases of antennas in a massive MIMO antenna system.

A configuration and operation for calibrating the transmission phase of an antenna in the massive MIMO antenna system are described with reference to FIG. 3. FIG. 3 shows the configuration for illustrating the measurement of a transmission phase unlike FIG. 2. Accordingly, lines corresponding to a transmission operation are indicated by a solid line, and lines regarding a reception operation not related to the transmission of a signal are indicated by a dotted line.

The configuration of FIG. 3 is described compared to FIG. 2. All basic elements are the same. However, a reception feedback port 102 is included in a wireless unit 10, and antenna ports 11, 12, 13, . . . , 1k have their paths connected to the reception feedback port 102. That is, signals output by the respective antenna ports are not directly output to the antennas, but are connected to the reception feedback port 102 configured for a test.

Furthermore, a modem 30 generates signals to be output to the respective antenna ports and outputs the signals to the switching and A/D converter 20. The switching and A/D converter 20 has the same configuration as that of FIG. 2. Accordingly, the switching and A/D converter 20 includes transmission/reception switches 211, 212, 213, . . . , 21k and A/D converters 221, 222, 223, . . . , 22k, each one corresponding to the number of antenna ports 11, 12, 13, . . . , 1k. The transmission/reception switches 211, 212, 213, . . . , 21k may be mapped to the antenna ports 11, 12, 13, . . . , 1k, respectively. Furthermore, the transmission/reception switches 211, 212, 213, . . . , 21k correspond to the respective A/D converters 221, 222, 223, . . . , 22k. As described above, each of the A/D converters 221, 222, 223, . . . , 22k may include a D/A converter for converting a digital signal to be transmitted therein into an analog signal and a band up-converter for band-up-converting the converted analog signal. Each of the A/D converters 221, 222, 223, . . . , 22k may include a band down-converter for converting a high frequency signal of a band received therein into a signal of a high frequency or baseband and an A/D converter for converting the band-down-converted analog signal into a digital signal.

An operation of calibrating the transmission phases of antennas in the massive MIMO antenna system including the above configuration is described.

The modem 30 generates signals to be output to the respective antenna ports 11, 12, 13, . . . , 1k, and sequentially generates and outputs test signals in accordance with the respective antenna ports. In this case, the test signal is a signal already known by the modem 30. Accordingly, each of the A/D converters 221, 222, 223, . . . , 22k converts the input test signal into an analog signal, and band-up-converts and outputs the analog signal. The signal output by each of the A/D converters 221, 222, 223, . . . , 22k is output from each of the transmission/reception switches 211, 212, 213, . . . 21k to each of the antenna ports through a configured transmission path. Accordingly, each of the antenna ports 11, 12, 13, . . . 1k feeds the transmitted signal back to the reception feedback port 102.

The reception feedback port 102 inputs the input signal to one of the A/D converters 221, 222, 223, . . . , 22k. FIG. 3 illustrates a case where the input signal is input to the last A/D converter #k 22k. Accordingly, the A/D converter #k 22k band-down-converts the input signal, converts the analog signal into a digital signal, and outputs the digital signal to the modem 30.

In this case, a massive MIMO antenna system includes a very large number of antennas. Accordingly, the wireless unit 10 includes a very large number of antenna ports in accordance with the very large number of antennas. In contrast, as illustrated in FIG. 3, the wireless unit 10 include only one port for feeding a test signal back from the antenna ports 11, 12, 13, . . . , 1k corresponding to the respective antennas. Accordingly, when signals are transmitted to all the antenna ports at once, all the signals are input to the reception feedback port 102 in the mixed state. Accordingly, there is a problem in that a corresponding signal cannot be identified to correspond to a signal received from which antenna port. Accordingly, the modem 30 may output test signals to be output to the respective antenna ports in a temporally continuous form.

As described in FIG. 3, the reason why only one path is placed in the reception feedback port 102 when a test signal is transmitted with respect to a transmission path is for excluding additional consideration attributable to a difference between the phases and amplitudes of reception paths when the phase is measured by transmitting the test signal and calibration is performed.

Figure 4:
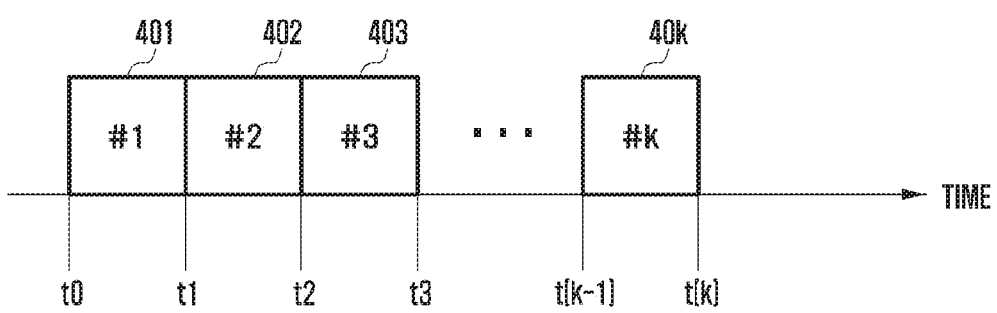
FIG. 4 is an output timing diagram of test signals output for the test of respective antenna ports in a modem.

FIG. 4 is an output timing diagram of test signals output for the test of respective antenna ports in a modem.

FIG. 4 illustrates a form in which test signals 401, 402, 403, . . . , 40k are sequentially output to the respective antenna ports 11, 12, 13, . . . , 1k. That is, the test signal 401 to be output to the antenna port #1 11 is output by the modem 30 from a point of time t0 to a point of time t1. The test signal 402 to be output to the second antenna port #2 12 is output by the modem 30 from the point of time t1 to a point of time t2. The test signal 403 to be output to the antenna port #3 13 is output by the modem 30 from the point of time t2 to a point of time t3. The test signal 40k to be output to the k-th antenna port #k 1k is output by the modem 30 from a point of time t(k−1) to a point of time t(k). In this case, FIG. 4 has been illustrated in the state in which time for changing the output path of some signal has not been taken into consideration between the test signals.

Accordingly, the test signal is input from each of the antenna ports 11, 12, 13, . . . , 1k to the reception feedback port 102 in a form, such as FIG. 4. As a result, a form in which the signals are input to the A/D converter 22k is the same as the form of FIG. 4. Accordingly, the modem 30 may receive the test signals for the respective antenna ports 11, 12, 13, . . . , 1k and measure the phase of each of the antenna ports.

However, the above-described method has a problem in that a lot of time is taken for the measurement of a phase in the transmission path and the calibration of each antenna port in proportion to the number of antennas and a processing time in the modem 30 because the modem 30 must transmit a signal for each antenna port.

Figure 5:
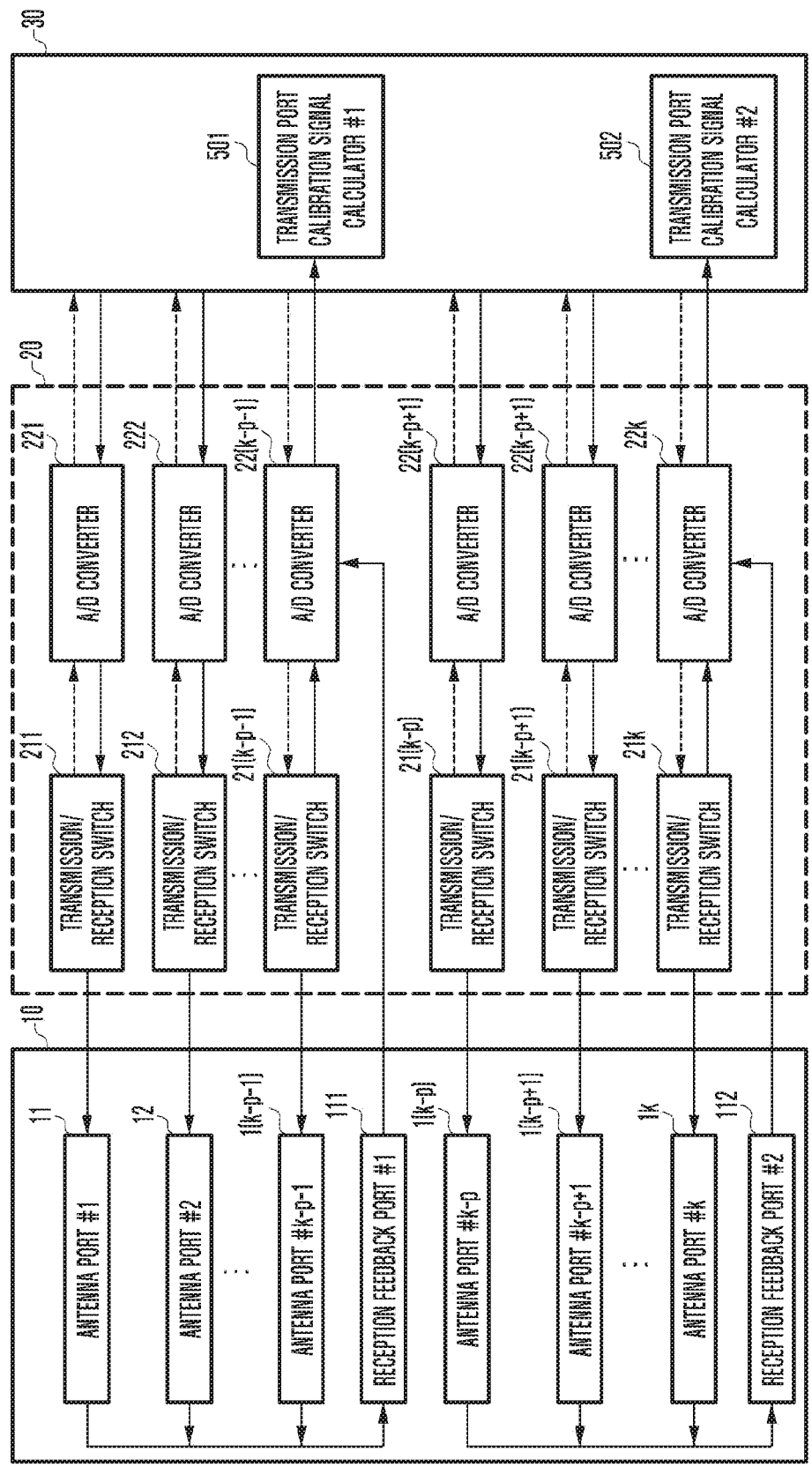
FIG. 5 shows a configuration for calibrating the transmission phases of antennas in a massive MIMO antenna system according to an embodiment of the disclosure.

FIG. 5 shows a configuration for calibrating the transmission phases of antennas in a massive MIMO antenna system according to an embodiment of the disclosure.

Referring to FIG. 5, a basic block configuration may be understood as being the same form as the configuration of FIGS. 2 and 3. However, in FIG. 5, in order to process a transmission test signal, a plurality of antenna ports is grouped. In FIG. 5, the antenna ports have been shown to form two groups, for convenience of description. However, unlike in that illustrated in FIG. 5, the antenna ports may be grouped into a plurality of two or more groups.

First, the configuration of FIG. 5 is described. Antenna ports 11, 12, ..., 1(k−p−1) are formed into one group and are input to one reception feedback port #1 111. Furthermore, antenna ports 1(k−p), 1(k−p+1), ..., 1k of another group are input to the other reception feedback port #2 112. As described above, the antenna ports 11, 12, ..., 1(k−p−1), 1(k−p), 1(k−p+1), ...1k are mapped to respective transmission/reception switches 211, 212, ..., 21(k−p), 21(k−p+1), ... 21k included in a switching and A/D converter 20. Furthermore, the transmission/reception switches 211, 212, ..., 21(k−p), 21(k−p+1), ... 21k are mapped to respective A/D converters 221, 222, ..., 22(k−p−1), 22(k−p), 22(k−p+1), ..., 22k.

Compared to FIG. 3, a wireless unit 10 includes a plurality of reception feedback ports, such as the reception feedback port #1 111 and the reception feedback ports #2. In each of the reception feedback ports 111, 112, a path is configured so that a signal is output to A/D converters within a corresponding group. In FIG. 5, the feedback path of the reception feedback port #1 111 has been illustrated as being input to the A/D converter 22(k−p−1). The feedback path of the reception feedback port #2 112 has been illustrated as being input to an A/D converter 22k.

Accordingly, the number of antennas and the number of antenna ports of the wireless unit 10 are the same as the case of FIG. 3. If antenna ports are grouped as described above, a modem 30 may generate and output reference signals to each group of antenna ports at the same point of time. To this end, in the disclosure, first, average delay between groups is calibrated, and a transmission test signal is generated and output. Furthermore, in order to transmit the same test signals at the same point of time for the calibration of a phase in accordance with the path to antenna ports included in each group, the test signals to be transmitted to respective antenna ports are multiplied by orthogonal codes having orthogonality and then output. Accordingly, the number of groups of antenna ports may be determined by a number that may be processed at once by the modem 30 in accordance with the transmission and reception of test signals and the number of codes having orthogonality.

That is, the modem 30 multiplies test signals to be output to the paths of the respective antenna ports 11, 12, ... 1(k−p−1) of the first group and to be fed back by codes having orthogonality, respectively, and outputs the signals at the same time. Accordingly, each of the A/D converters 221, 222, ..., 22(k−p−1) converts the test signal, multiplied by the orthogonal code, into an analog signal, and band-up-converts and outputs the signal. Accordingly, the transmission/reception switches 211, 212, ..., 21(k−p−1) corresponding to the respective A/D converters 221, 222, ..., 22(k−p−1) configure and output the test signals so that they are input to the respective antenna ports 11, 12, ..., 1(k−p−1).

Accordingly, each of the antenna ports 11, 12, ..., 1(k−p−1) belonging to the first group outputs a signal to the reception feedback port #1 111. All the signals output to the antenna ports 11, 12, ..., 1(k−p−1) as described above have been multiplied by the codes having orthogonality and output at the same point of time. Accordingly, the signals are input to the reception feedback port #1 111 at the same point of time. Accordingly, the reception feedback port #1 111 corresponding to the first group may output the signals, input at the same point of time and multiplied by the codes having orthogonality, to the A/D converter 22(k−p−1) at once.

Accordingly, the A/D converter 22(k−p−1) band-down-converts the signal, converts the analog signal into a digital signal, and outputs the digital signal to the modem 30. The modem 30 may include transmission port calibration signal calculators 501 and 502 in accordance with the respective groups. Each of the transmission port calibration signal calculators 501 and 502 included in the modem 30 may be implemented in a program form, may be implemented in a logic form, or may be implemented in a firmware form. The transmission port calibration signal calculators 501 and 502 perform the same operation, and thus only one operation is described.

The transmission port calibration signal calculator #1 501 may receive the test signals multiplied by the codes having orthogonality and to be output to the respective antenna ports 11, 12, ..., 1(k−p−1) at once, and may classify the test signals to be output to the ports 11, 12, ..., 1(k−p−1) by multiplying the test signals by codes again and removing the codes. Accordingly, a change in the phase according to the transmission path of the test signal for each port can be easily detected.

Signals output to the antenna ports 1(k−p), 1(k−p+1), 1k, that is, a second group, may use the same code as the code of the first group. A configuration may be performed so that signals are transmitted at the same point of time or may be performed so that signals for the test of the second group are transmitted at once after the signals of the first group are transmitted. In a determination of such a point of time, a configuration may be performed so that test signals are transmitted with a given time difference for each group depending on the processing ability of the modem 30 or may be performed so that the test signals are transmitted to the groups at the same time.

In this case, codes having orthogonality are described more specifically. Characteristics necessary for the code having orthogonality are as follows.

Sequences need to be classified for each antenna based on orthogonal characteristics upon accumulation for each subband.

The orthogonality of a code that may be divided as many as the number of antennas necessary for a test is necessary for each minimum subband.

A sequence or code that satisfies the above code sequence characteristics and that is divided and available as a test signal includes a Zadoff-Chu sequence, a Walsh code, a Hadarmad sequence, etc. Furthermore, a phase response for each antenna may be calculated like Equation 1 below using the above sequences or codes.

Equation 1

$$Z(k) = \Sigma h_m(k) X_m(k)$$

In Equation 1, $X_m(k)$ is a test signal corresponding to the k-th frequency of an m-th antenna from among test signals. $h_m(k)$ is a phase response corresponding to the k-th subcarrier of the m-th antenna. In antennas, $X_m(k)$ transmitted at the same time are merged in a reception stage for each antenna. A signal received through the k-th frequency is represented like Equation 1.

Furthermore, the code sequence of Equation 1 establishes Equation 2 based on its characteristics.

Equation 2

$$\Sigma_k X_1(k) X^*_m(k) = 0$$

Accordingly, $R_m(k)$, that is, a response to the k-th subcarrier of the m-th antenna, may be calculated using Equation 1 and Equation 2. In this case, $R_m(k)$, that is, a response to the k-th subcarrier of the m-th antenna, is a value calculated by the accumulation of subbands, and thus the same $R_m(k)$ needs to be applied to the subcarrier of the number of tones (Ntone). That is, an assumption is necessary in which antenna phase characteristics are flat within the number of tones (Ntone) of the subband. Accordingly, Equation 3 below may be determined.

$$R_m(k) = \frac{1}{N_{tone}} \sum_k^{N_{tone}} Z(k) X_m^*(k) = $$

$$h_m + \frac{1}{N_{tone}} \sum_{l \neq m} h_l \sum_k X_l(k) X_m^*(k) = h_m$$

[Equation 3]

Figure 6A:
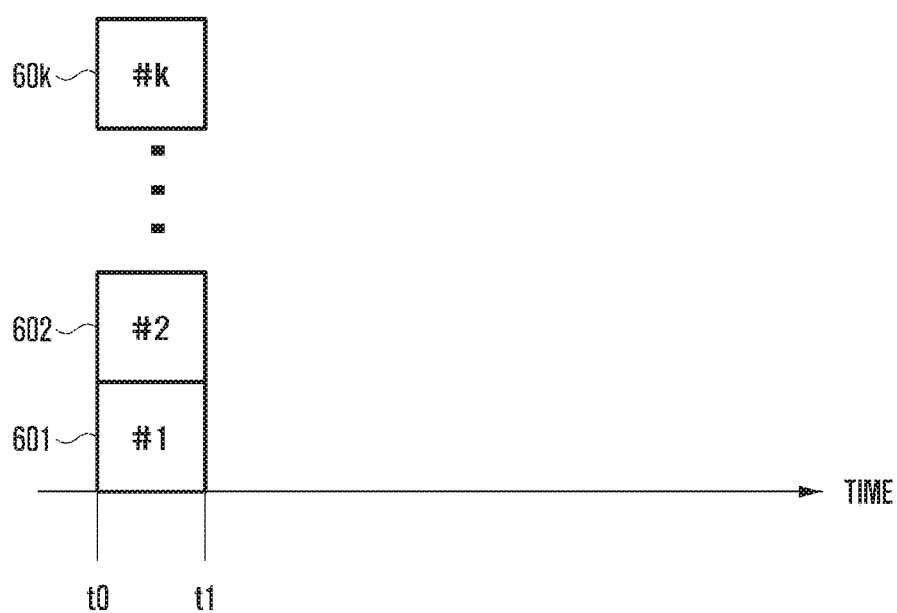
FIG. 6A is a timing diagram for illustrating a case where a test signal is transmitted for each group according to an embodiment of the disclosure.
Figure 6B:
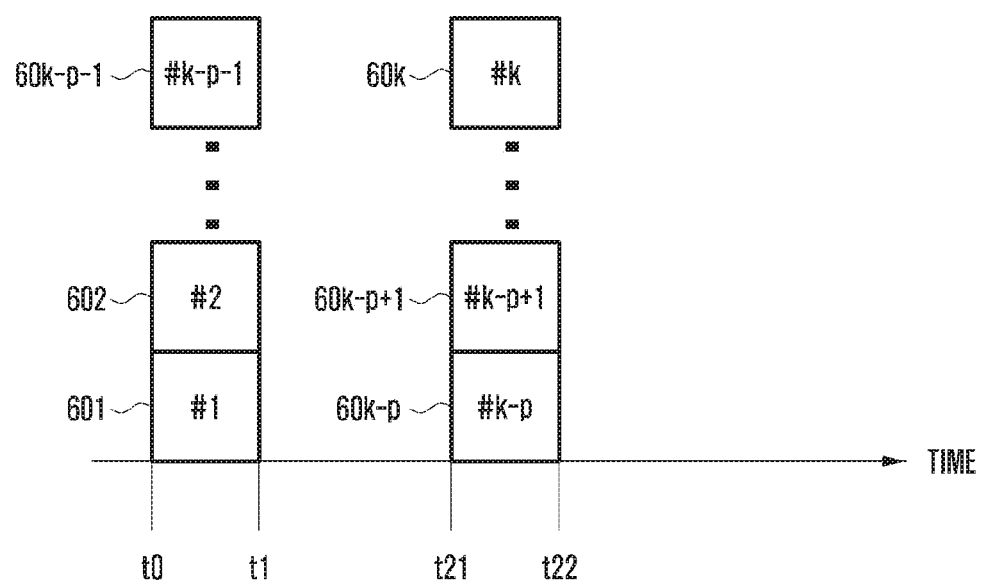
FIG. 6B is a timing diagram for illustrating a case where a test signal is transmitted for each group according to an embodiment of the disclosure.

Accordingly, schemes for transmitting test signals in various ways according to the above-described form are described. FIG. 6A is a timing diagram for illustrating a case where a test signal is transmitted for each group according to an embodiment of the disclosure. FIG. 6B is a timing diagram for illustrating a case where a test signal is transmitted for each group according to an embodiment of the disclosure.

Referring first to FIG. 6A, test signals are transmitted to all ports from a point of time t0 to a point of time t1, that is, the same points of time, regardless of the ports divided into groups. In this case, the test signals have been multiplied by different codes having orthogonality within a group divided for each port. That is, a test signal 601 output to the antenna port #1 11 and a test signal 602 output to the antenna port #2 12 are the same test signal, but have been multiplied by different codes having orthogonality. A CDM code may be used as such a code. In this case, the same code may be used for each group. For example, an orthogonal code by which the signal output to the antenna port #1 11 has been multiplied and an orthogonal code by which the signal output to the antenna port #k-p 1(k-p) has been multiplied may be the same code. That is, an orthogonal code may be reused for each group. FIG. 6A is a timing diagram illustrating a case where all test signals are transmitted at once from the antenna port #1 11 to the antenna port #k using such a method.

FIG. 6B shows a case where points of time at which test signals are transmitted are different for each group. That is, test signals output to the respective antenna ports 11, 12, . . . , 1k-p-1, that is, a first group, are identically transmitted from a point of time t0 to a point of time t1. In this case, test signals 601, 602, . . . , 60k-p-1 are signals multiplied by different codes having orthogonality, and may have been multiplied by CDM codes, for example. A change in the phase may be tested and corresponding calibration may be performed for each path of antenna ports by transmitting and feeding back test signals with respect to the antenna ports of the first group as described above.

Thereafter, test signals output to the respective antenna ports 1(k-p), 1(k-p+1), . . . , 1k, that is, a second group, are transmitted from a point of time t21 to a point of time t22. In this case, the test signals 60k-p, 60k-p+1, . . . 60k are signals multiplied by different codes having orthogonality, and may have been multiplied by CDM codes, for example Furthermore, the same code may be used because the first group and the second group are different groups. For example, an orthogonal code by which the signal output to the antenna port #1 11 has been multiplied and an orthogonal code by which the signal output to the antenna port #k-p 1(k-p) has been multiplied may be the same code. That is, an orthogonal code may be reused for each group.

A change in the phase may be tested and corresponding calibration may be performed for each path of antenna ports by performing the transmission and feedback processing of the test signals for the antenna ports of the first group and then transmitting and feeding back the test signals with respect to the antenna ports of the second group as described above. If signals are transmitted as in FIG. 6B, only one reception feedback port may be configured in FIG. 5. That is, a configuration may be performed so that only one reception feedback port is used, the grouping of antenna ports is the same, and test signals are transmitted at different times for each group. An advantage when test signals are transmitted as in the case of FIG. 6B is that the disclosure may be applied to a case where it is difficult to additionally configure a feedback port in the wireless unit 10. The physical configuration form of FIG. 6B is described again in FIG. 8.

Figure 7:
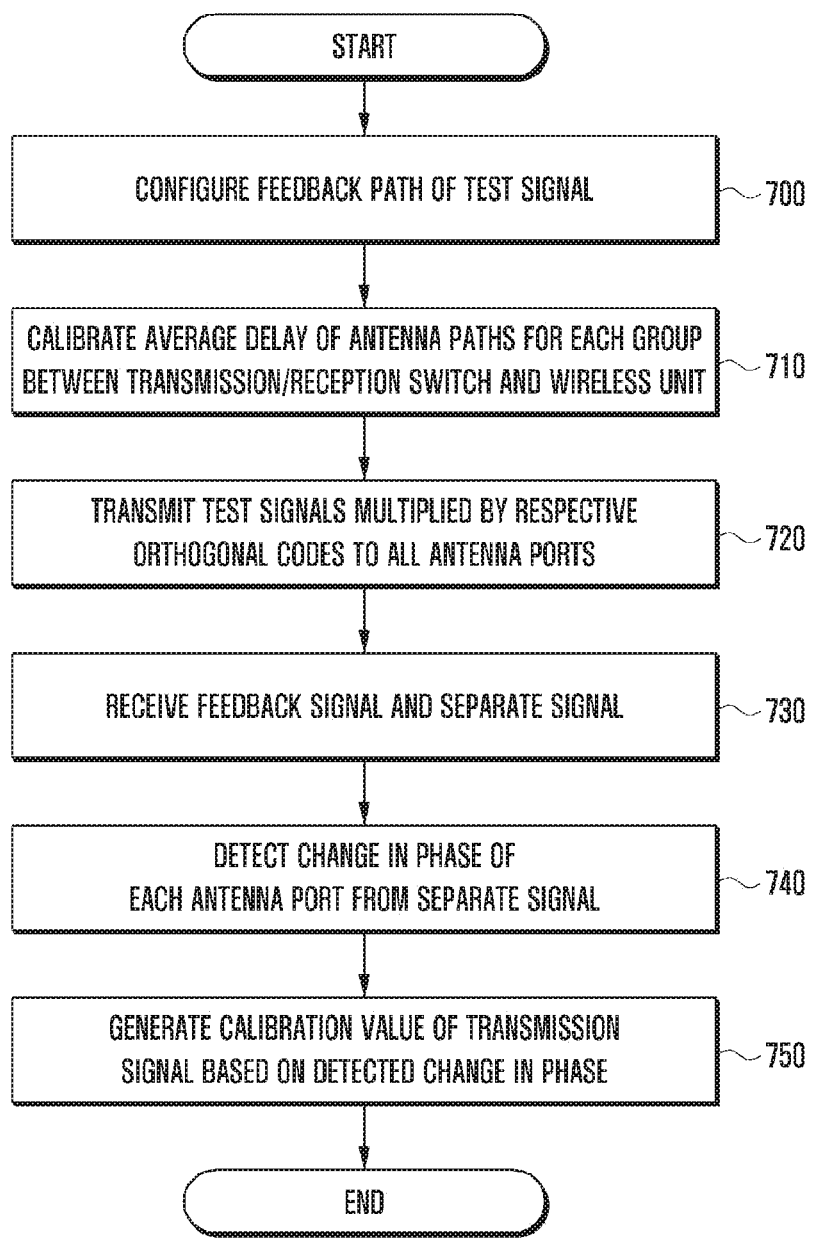
FIG. 7 is a control flowchart when the transmission phases of antennas are calibrated in the massive MIMO antenna system according to an embodiment of the disclosure.

FIG. 7 is a control flowchart when the transmission phases of antennas are calibrated in the massive MIMO antenna system according to an embodiment of the disclosure.

In the following description, the flowchart of FIG. 7 may be performed in the controller 40 or may be performed in the modem 30. A case where the flowchart is performed in the modem 30 is described below, for convenience of description.

The modem 30 performs control so that the feedback path of a test signal is configured at step 700. That is, in FIG. 5, the transmission/reception switch path of the transmission/reception switches 211, 212, . . . , 21(k-p-1), 21(k-p), 21(k-p+1), . . . , 21k is configured to become a transmission path. Furthermore, at step 700, the modem 30 performs control so that antenna ports up to the respective antenna ports 11, 12, 1(k-p-1) are connected to the reception feedback port #1 111, and performs switching so that antenna ports up to the antenna port 1(k-p), 1(k-p+1), . . . , 1k are connected to the reception feedback port #2 112.

Thereafter, the modem 30 calibrates average delay of antenna paths for each group between the transmission/reception switches and the wireless unit 10 at step 710. For example, when the delay of a feedback path to the reception feedback port #1 111 and the delay of a feedback path to the reception feedback port #2 112 are different, calibration is performed as much as a corresponding value. For example, if the feedback path to the reception feedback port #1 111 has speed 0.1 ms faster than the feedback path to the reception feedback port #2 112, a signal toward the reception feedback port #1 111 may be delayed 0.1 ms and output. According to another method, calibration may be performed as much as a delay time in a received signal. It is to be noted that step 710 is a step for previously recognizing a calibration value for each feedback path.

After delay at step 710 is calibrated, the modem 30 proceeds to step 720 in which test signals multiplied by respective orthogonal code are transmitted to all the antenna ports. That is, as in FIG. 6A, the test signals are transmitted to all the ports, and the transmitted signals have been multiplied by orthogonal codes or sequences as described above. Accordingly, when the signals are transmitted at step 720, they are output to the antenna ports 11, 12, . . . , 1(k-p-1), 1(k-p), 1(k-p+1), . . . , 1k through the A/D converters 221, 222, . . . , 22(k-p-1), 22(k-p), 22(k-p+1), . . . , 22k and the transmission/reception switches 211, 212, . . . , 21(k-p-1), 21(k-p), 21(k-p+1), . . . , 21k, respectively, for each path, and are input to the corresponding reception feedback ports 111 and 112. The signals are fed back to the modem 30 through the A/D converters 22(k–p–1) and 22k connected to the feedback ports.

In the modem 30, all the feedback signals may have been transmitted at the same point of time or time calibration may have been performed. If the feedback signals have been transmitted without performing time calibration, the modem 30 performs time calibration using a received signal. Thereafter, the model separates a signal for each antenna port from the signal received for each feedback port. Equation 3 may be used for such separation. After the signals are separated as described above, the modem 30 may proceed to step 740 in which a change in the phase of each antenna port is detected or calculated from the separate signal.

The modem 30 may detect a change in the phase for each antenna with respect to each of the separated signals at step 740, and may generate a calibration value of the transmitted signal based on the detected change in the phase at step 750.

Figure 8:
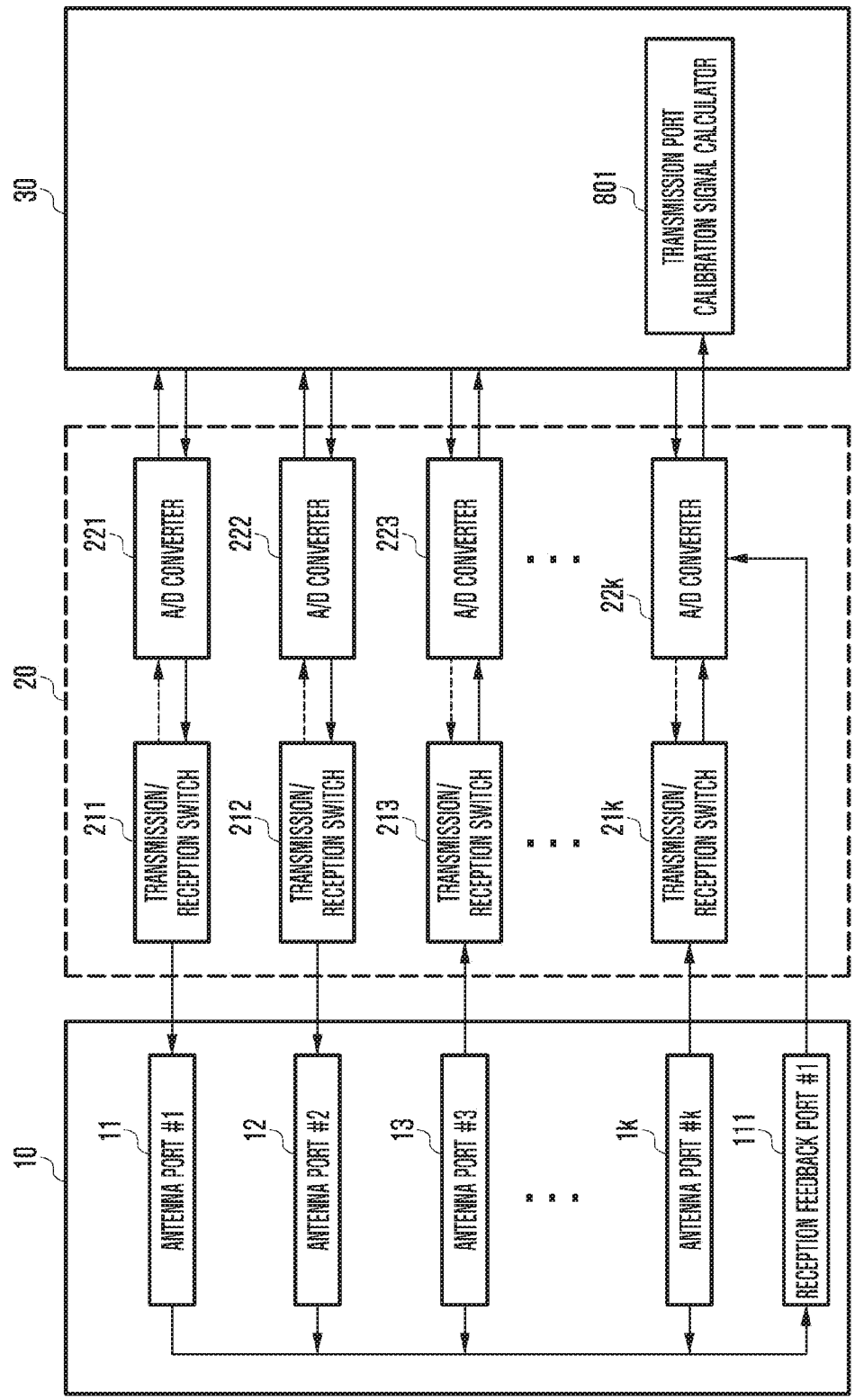
FIG. 8 shows a configuration for calibrating the transmission phases of antennas in the massive MIMO antenna system according to another embodiment of the disclosure.

FIG. 8 shows a configuration for calibrating the transmission phases of antennas in the massive MIMO antenna system according to another embodiment of the disclosure.

The wireless unit 10 of FIG. 8 has the same configuration as the case of FIG. 3. Furthermore, a switching and A/D converter 20 also has the same configuration as that of FIG. 3. In FIG. 8, antennas, that is, antenna ports, are grouped like FIG. 5 and signals are configured to be transmitted to the grouped antenna ports. Accordingly, as described in FIG. 6B, test signals need to be time-divided and transmitted with respect to the grouped antenna ports. The method described in FIG. 7 may be used for the calibration of antenna ports for each group without any change.

The case of FIG. 8 requires more time for a process for the calibration of a path to each antenna compared to FIG. 5. However, the case of FIG. 8 has an advantage in that the existing form can be maintained without any change because only one reception feedback port is configured and there is no additional change in the configuration of the switching and A/D converter 20.

Figure 9:
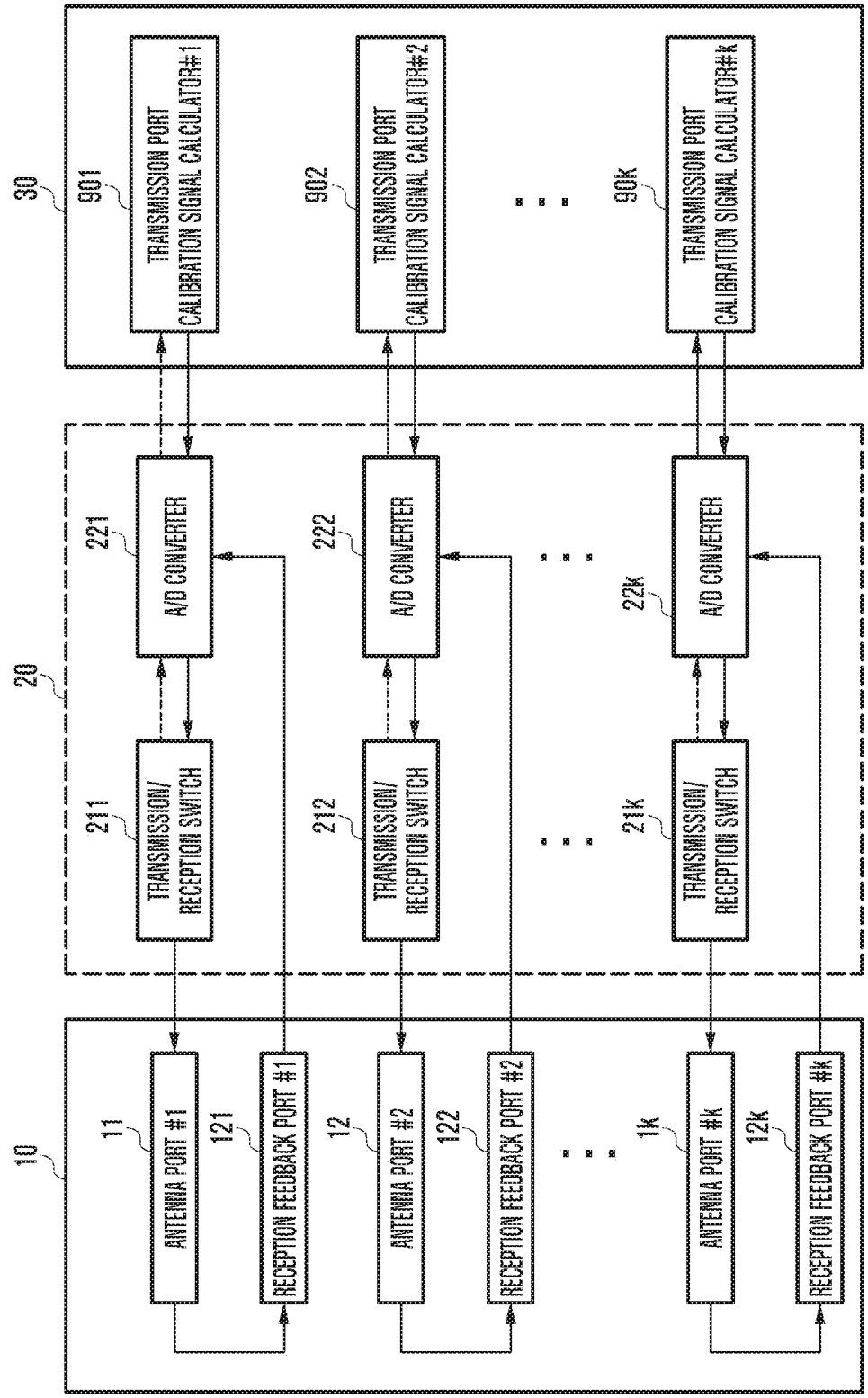
FIG. 9 shows a configuration for calibrating the transmission phases of antennas in the massive MIMO antenna system according to yet another embodiment of the disclosure.

FIG. 9 shows a configuration for calibrating the transmission phases of antennas in the massive MIMO antenna system according to yet another embodiment of the disclosure.

FIG. 9 is a case where a reception feedback port is included in each antenna port. Referring to FIG. 9, in the configuration of a wireless unit 10, a reception feedback port #1 121 corresponding to an antenna port #1 11 is connected, a reception feedback port #2 122 corresponding to an antenna reception port #2 12 is connected, and a reception feedback port #k 12k corresponding to an antenna port #k is connected. As described above, the reception feedback ports 121, 122, . . . , 12k are included in the respective antenna ports, and the feedback ports 121, 122, . . . , 12k are connected to feed signals back to A/D converters 221, 222, . . . 22k corresponding to the antenna ports, respectively.

Accordingly, a modem 30 may include transmission port calibration signal calculators 901, 902, . . . , 90k corresponding to the respective antenna ports. Furthermore, the transmission port calibration signal calculators 901, 902, . . . , 90k may be configured in separate logic, may be configured in a program form or may be implemented in a firmware form, as described above.

In the configuration of a form, such as FIG. 9, a load of the wireless unit 10 and the switching and A/D converter 20 may increase in a massive MIMO antenna system because a feedback loop is configured for each antenna port. Furthermore, even in the modem 30, additional calculation may be necessary because the delay of each transmission path to each antenna port must be taken into consideration. That is, an overall burden of the system increases.

If a system is configured like FIG. 9, however, a code having orthogonality is not necessary because a separate additional operation when a signal is generated for the test of a transmission path, for example, an operation of multiplying a signal by a code or sequence and removing the code or sequence from a received signal, is not necessary. Furthermore, there is an advantage in that a response can be measured for each subcarrier without accumulation using a subband method if the response is obtained for each path.

Accordingly, the advantages of the above-described methods are arranged and described below. If the feedback method of a test signal for calibration in a massive antenna system, proposed in the disclosure, is applied, there is an effect in that a transmission (Tx) calibration processing time linearly increasing depending on the number of antennas can be reduced by the number of groups or the number of feedback ports classified based on a code group. Furthermore, in the last embodiment, delay for each antenna port and a change in the phase can be detected and calibrated by rapidly feeding a test signal for calibration back without an additional time, such as processing a code having orthogonality.

Comparisons between Tx calibration processing times using test signals may be illustrated like Table 1 below in the case of FIG. 3, and the cases of the first embodiment (FIG. 5), second embodiment (FIG. 8) and third embodiment (FIG. 9) of the disclosure.

TABLE 1

|  | FIG. 3 | FIG. 5 | FIG. 8 | FIG. 9 |
|---|---|---|---|---|
| Processing time | $N_{Tx}\tau$ | $\lceil \frac{N_{Tx}}{N}/L \rceil \tau = \lceil N_{Tx}\frac{L}{N} \rceil$ | $\lceil \frac{N_{Tx}}{L} \rceil$ | $\tau$ |
| Path response estimation unit | Subcarrier | Subband | Subband | Subcarrier |

In the table, the calibration processing time has been assumed to be $\tau$ for each transmission path, for convenience sake. Accordingly, in the case of FIG. 5, L groups not two feedback loops has been generalized as being configured, and the total number of antennas has been assumed to be NTx. As illustrated in Table 1, according to the embodiments of the disclosure, there is an advantage in that a calibration time that must be performed for each antenna port as in FIG. 3 can be reduced efficiently.

The embodiments disclosed in the specification and drawings described above propose only specific examples in order to easily describe the contents of the disclosure and help understanding of the disclosure, and are not intended to restrict the scope of the disclosure. Accordingly, the scope of the disclosure should be understood as including all changes and modified forms derived based on the technical spirit of the disclosure in addition to the disclosed embodiments.

INDUSTRIAL APPLICABILITY

The disclosure may be used in a massive antenna system.

The invention claimed is:
1. A method of calibrating a phase of an antenna in a massive antenna system, the method comprising:
grouping the massive antennas into a preset number of groups;

configuring a path so that the grouped antenna ports have a feedback path;

outputting a test signal to be output to each antenna port of each group by adding a code or sequence having orthogonality to the test signal;

separating a signal from a signal received through the feedback path for each antenna port within a corresponding group using the code or sequence having orthogonality; and calculating a calibration value by detecting a change in a phase of the separated signal.

2. The method of claim 1, further comprising calibrating previously calculated average delay for each group.

3. The method of claim 1, wherein the code or sequence having orthogonality is one of a Walsh code or a Zadoff-Chu sequence or a Hadarmad sequence.

4. The method of claim 3, wherein the preset number of groups is determined based on a number of codes or a number of sequences having orthogonality.

5. The method of claim 1, further comprising sequentially outputting the test signals for each group when the test signal is output by adding the code or sequence having orthogonality to the test signal.

6. The method of claim 1, wherein the test signals of all the grouped groups are output simultaneously when the test signal is output by adding the code or sequence having orthogonality to the test signal.

7. The method of claim 1, wherein the code or sequence having orthogonality is reused in each group.

8. An apparatus for calibrating a phase of an antenna in a massive antenna system, the apparatus comprising:
  a wireless unit configured to comprise antenna ports corresponding to respective antennas and feedback ports grouped in a given antenna number unit;
  a switching and analog/digital (A/D) converter configured to comprise transmission/reception switches corresponding to respective antenna ports of the wireless unit and analog-digital converters corresponding to the transmission/reception switches; and
  a modem configured to control a configuration of a path so that the grouped antenna ports have a feedback path, generate a test signal to be output to each antenna port of each group, output the generated test signal by adding a different code or sequence having orthogonality to the test signal, separate a signal from a signal received through the feedback path for each antenna port within a corresponding group using the code or sequence having orthogonality, and calculate a calibration value by detecting a change in a phase of the separated signal.

9. The apparatus of claim 8, wherein the modem calibrates previously calculated average delay for each group.

10. The apparatus of claim 8, wherein the code or sequence having orthogonality is one of a Walsh code or a Zadoff-Chu sequence or a Hadarmad sequence.

11. The apparatus of claim 10, wherein the number of groups is determined based on a number of codes or a number of sequences having orthogonality.

12. The apparatus of claim 8, wherein:
  the wireless unit has one feedback port, and
  the modem controls the test signals so that the test signals are sequentially output for each group when the test signal is output by adding the code or sequence having orthogonality to the test signal.

13. The apparatus of claim 8, wherein the wireless unit controls the test signals of all the grouped groups so that the test signals are output simultaneously when the test signal is output by adding the code or sequence having orthogonality to the test signal.

14. The apparatus of claim 8, wherein the code or sequence having orthogonality is reused in each group.

15. An apparatus for calibrating a phase of an antenna in a massive antenna system, the apparatus comprising:
  a wireless unit configured to comprise antenna ports corresponding to respective antennas and a feedback port corresponding to each of the antenna ports;
  a switching and analog/digital (A/D) converter configured to comprise transmission/reception switches corresponding to respective antenna ports of the wireless unit and to comprise analog-digital converters corresponding to the transmission/reception switches and receiving signals output from the feedback ports; and
  a modem configured to generate and output a test signal to be output to each of the antenna ports and to calculate a calibration value by detecting a change in a phase from a signal received through each feedback path.

* * * * *